United States Patent
Sasaki

(10) Patent No.: US 7,561,746 B2
(45) Date of Patent: Jul. 14, 2009

(54) IMAGE TRANSMITTER FOR TRANSMITTING A FRAME OF A FIXED NUMBER OF PACKETS WHERE EACH PACKET HAS A FIXED NUMBER OF IMAGE DATA

(75) Inventor: Shin Sasaki, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 702 days.

(21) Appl. No.: 11/267,274

(22) Filed: Nov. 7, 2005

(65) Prior Publication Data

US 2006/0209335 A1 Sep. 21, 2006

(30) Foreign Application Priority Data

Mar. 17, 2005 (JP) ............... 2005-076192

(51) Int. Cl.
*G06K 9/36* (2006.01)
*G06K 9/54* (2006.01)
*G06K 9/46* (2006.01)

(52) U.S. Cl. .................... 382/232; 382/305
(58) Field of Classification Search ............. 382/232, 382/233, 305; 358/1.15; 375/130, 240.26, 375/240.28, 340, 346, E7.271; 370/347, 370/381, 384; 711/120; 712/14; 714/752, 714/759, 799, 807
See application file for complete search history.

(56) References Cited

U.S. PATENT DOCUMENTS

| | | | | |
|---|---|---|---|---|
| 4,704,606 A | * | 11/1987 | Hasley | 370/381 |
| 5,864,577 A | * | 1/1999 | Ramel | 375/130 |
| 5,948,119 A | * | 9/1999 | Bock et al. | 714/807 |
| 6,092,173 A | * | 7/2000 | Sasaki et al. | 712/14 |
| 6,236,432 B1 | * | 5/2001 | Lee | 375/240.26 |
| 6,252,917 B1 | * | 6/2001 | Freeman | 375/340 |
| 6,560,463 B1 | * | 5/2003 | Santhoff | 455/522 |
| 6,574,211 B2 | * | 6/2003 | Padovani et al. | 370/347 |
| 6,850,577 B2 | * | 2/2005 | Li | 375/326 |
| 6,882,634 B2 | * | 4/2005 | Bagchi et al. | 370/338 |
| 6,898,204 B2 | * | 5/2005 | Trachewsky et al. | 370/445 |
| 2006/0209335 A1 | * | 9/2006 | Sasaki | 358/1.15 |

FOREIGN PATENT DOCUMENTS

JP 2002-247577 A 8/2002

* cited by examiner

*Primary Examiner*—Amir Alavi
(74) *Attorney, Agent, or Firm*—Birch, Stewart, Kolasch & Birch, LLP

(57) ABSTRACT

An image transmitter has: an encoder for receiving image data and outputting coded image data; a packet transmitter for receiving the coded image data from the encoder, buffering the coded image data while counting a data number, and when coded image data of one packet of a fixed length is buffered, packetizing the coded image data and transmitting the packetized coded image data; a first enable signal generator for generating a first enable signal which becomes enable at a start of transmission of each packet and disable at an end of transmission; and a second enable signal generator for generating a second enable signal which becomes enable at a start of transmission of a predetermined number of packets and disable at an end of transmission. The image transmitter and image transmitting method are provided which can transmit image data to an application chip fabricated on the assumption that it receives a packet of a fixed data number and a frame of a fixed packet number.

20 Claims, 3 Drawing Sheets

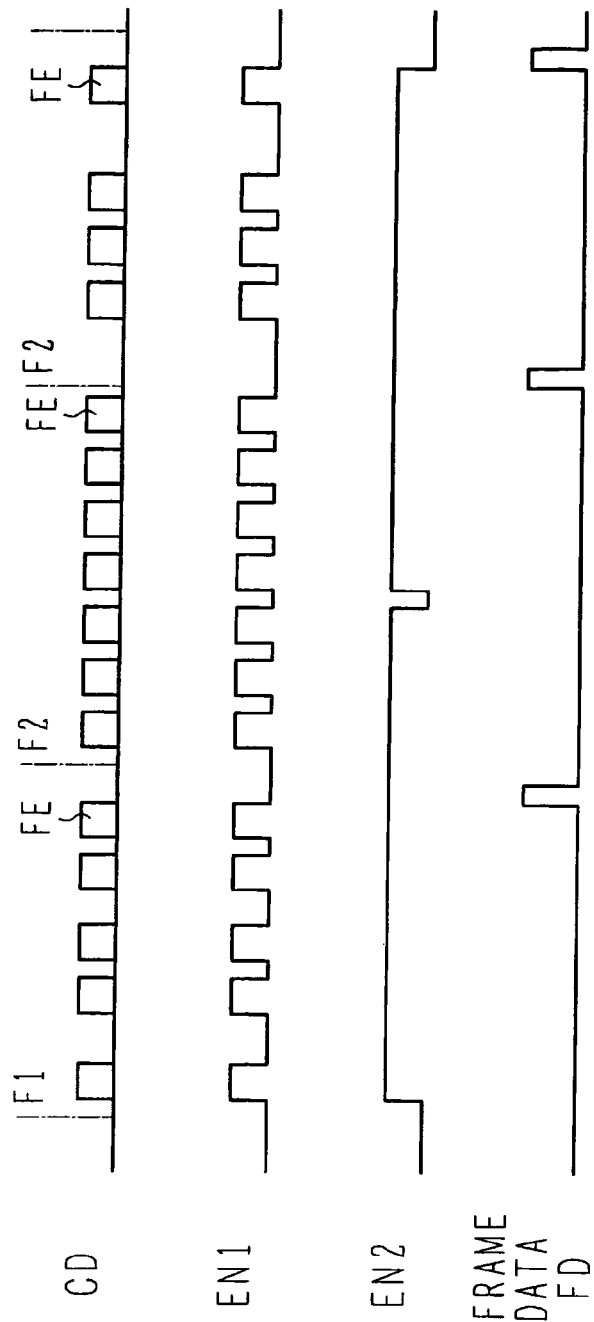

ized coded data and transmitting the packetized coded

IMAGE TRANSMITTER FOR TRANSMITTING A FRAME OF A FIXED NUMBER OF PACKETS WHERE EACH PACKET HAS A FIXED NUMBER OF IMAGE DATA

CROSS REFERENCE TO RELATED APPLICATION

This application is based on and claims priority of Japanese Patent Application No. 2005-076192 filed on Mar. 17, 2005, the entire contents of which are incorporated herein by reference.

BACKGROUND OF THE INVENTION

A) Field of the Invention

The present invention relates to an image transmitter, and more particularly to an image transmitter for transmission of moving images or the like which variable-length compresses input image data and sequentially transmits compressed image information.

B) Description of the Related Art

Digital image information is widely used because of propagation of digital cameras. Image information has a large information quantity so that data compression processing is performed for data storage and communications. JPEG and the like are prevailing as compression processing for image information. Data compression processing of JPEG is performed by using pixel groups of 8×8, 16×16 and the like as a basic unit. For 8×8 and 16×16 pixel groups, process units are 8 rows and 16 rows, respectively. This process unit is also called a macro block where appropriate. Data compression is performed after a macro block of 8 or 16 rows is input. JPEG compression outputs variable length data.

Generally, an image transmitter compresses input image data, stores the compressed coded data in a frame memory, and transmits it after necessary processes are executed. Most of application chips for receiving coded image data and decoding it for display or the like are fabricated on the assumption that a packet is made of a predetermined data number (hereinafter called a fixed data number) and a frame (fixed length frame) constituted of a predetermined number of packets (fixed packet number) is received. Since an encoding process generates variable length coded data, it cannot be transmitted unless proper processes are executed. It has been proposed that if coded data buffered in the frame memory is smaller than the predetermined data length, dummy data is added to the coded data to form a fixed length frame.

FIGS. 3A and 3B are a block diagram realizing an embodiment of JP-A-2002-247577 and its data format.

Referring to FIG. 3A, a camera 51 acquires moving image data at a predetermined time interval, and sequentially inputs it to an image encoder 52. The image encoder 52 encodes (digitalizes) the input moving image data of each macro block and variable-length encodes it to remove redundancy. Moving image data variable-length encoded by the image encoder 52 is sent to a frame separator circuit 53 via a data line Ii at a transmission rate varying at each moving image (frame) data. The frame separator circuit 53 forms a frame having a predetermined constant data length from the input moving image data varying its data length (having a different data length) each time it is input, and outputs the frame to a data line Iii.

FIG. 3B shows a frame format having a constant data length. One frame is constituted of T bytes. A top field includes a sync word SW of one byte and a valid data number BN of one byte, of moving image data. Therefore, the remaining number of bytes is T−2. If the moving image data 63 has x bytes, dummy data 64 of T−x−2 is added. In this manner, a frame having a constant data length T is formed by adding the dummy data. If the data length of moving image data is longer than the data length capable of being inserted in one frame, the moving image data in excess of the constant data length is discarded. A modulator 54 modulates an input frame by a predetermined modulation scheme and sends it out to a transmission line at a constant transmission rate.

A demodulator 55 receives a frame transmitted via the transmission line, demodulates it, and supplies it to a data reproduction circuit 56 via a data line IIi. The data reproduction circuit 56 performs frame synchronization by detecting the sync word SW from each input frame, and detects the valid data number BN from each received frame. The data reproduction circuit 56 extracts moving image data 63 of the valid data number BN from the frame data excluding the sync word SW and valid data number BN. The extracted moving image data 63 is supplied to an image decoder 57 via a data line IIii. The image decoder 57 decodes moving image data and sends decoded moving image data to a monitor 58. The monitor 58 displays the moving image.

A frame memory is used for buffering coded data of one frame and adding dummy data to form frame data of a constant length. A data amount of image data of one frame is large not negligible even if the image data is compressed data, and the capacity of the frame memory is not negligible.

SUMMARY OF THE INVENTION

An object of this invention is to provide an image transmitter without using a frame memory, and being capable of transmitting a frame to an application chip fabricated on the assumption that it receives a packet of a fixed data number and a frame of a fixed packet number.

Another object of this invention is to provide an image transmitting method without using a frame memory, and being capable of transmitting a frame to an application chip fabricated on the assumption that it receives a packet of a fixed data number and a frame of a fixed packet number.

According to one aspect of the present invention, there is provided an image transmitter comprising: an encoder for receiving image data and outputting coded image data; a packet transmitter for receiving the coded image data from the encoder, buffering the coded image data while counting a data number, and when coded image data of one packet corresponding to a fixed data number is buffered, packetizing the coded image data and transmitting the packetized coded image data; a first enable signal generator for generating a first enable signal which becomes enable at a start of transmission of each packet and disable at an end of transmission; and a second enable signal generator for generating a second enable signal which becomes enable at a start of transmission of packets of a fixed packet number and disable at an end of transmission.

According to another aspect of the present invention, there is provided an image transmitting method comprising: an encoding step of receiving image data and outputting coded image data; a packet transmitting step of receiving the coded image data, buffering the coded image data while counting a data number, and when coded image data of one packet corresponding to a fixed data number is buffered, packetizing the coded image data and transmitting the packetized coded image data; a first enable signal generating step of generating a first enable signal which becomes enable at a start of transmission of each packet and disable at an end of transmission; and a second enable signal generating step of generating a second enable signal which becomes enable at a start of transmission of packets of a fixed packet number and disable at an end of transmission.

Instead of using an enable signal representative of a data length of one frame, a different enable signal is generated which becomes enable at the start of transmission of a predetermined number of packets and disable at the end of transmission of the predetermined number of packets, the end being detected by counting the packets. It is therefore possible for an application chip to receive coded image data. Although a set of received coded data packets is a data group different from the data in the original frame, the application chip can adjust the received coded data and demodulate an image of each frame.

BRIEF DESCRIPTION OF THE DRAWINGS

FIGS. 2A, 2B and 2C are a timing chart showing timings of various signals in the image transmitter shown in FIG. 1, and diagrams showing data format of the last packet of a frame.

DESCRIPTION OF THE PREFERRED EMBODIMENTS

If an image transmitter for compressing image data and transmitting it can omit a frame memory, the structure can be simplified, a chip area can be reduced and a production cost can be reduced. However, if encoded variable length image data is to be transmitted at a fixed data length, it is necessary not only to add dummy data to the last packet if necessary after the last macro block is encoded, in order to packetize it, but also to generate dummy packets if the number of packets is insufficient. It is not always possible to encode the last macro block and further perform such processes after the last macro block is encoded. It is therefore very difficult to omit the frame memory.

Figure 1:
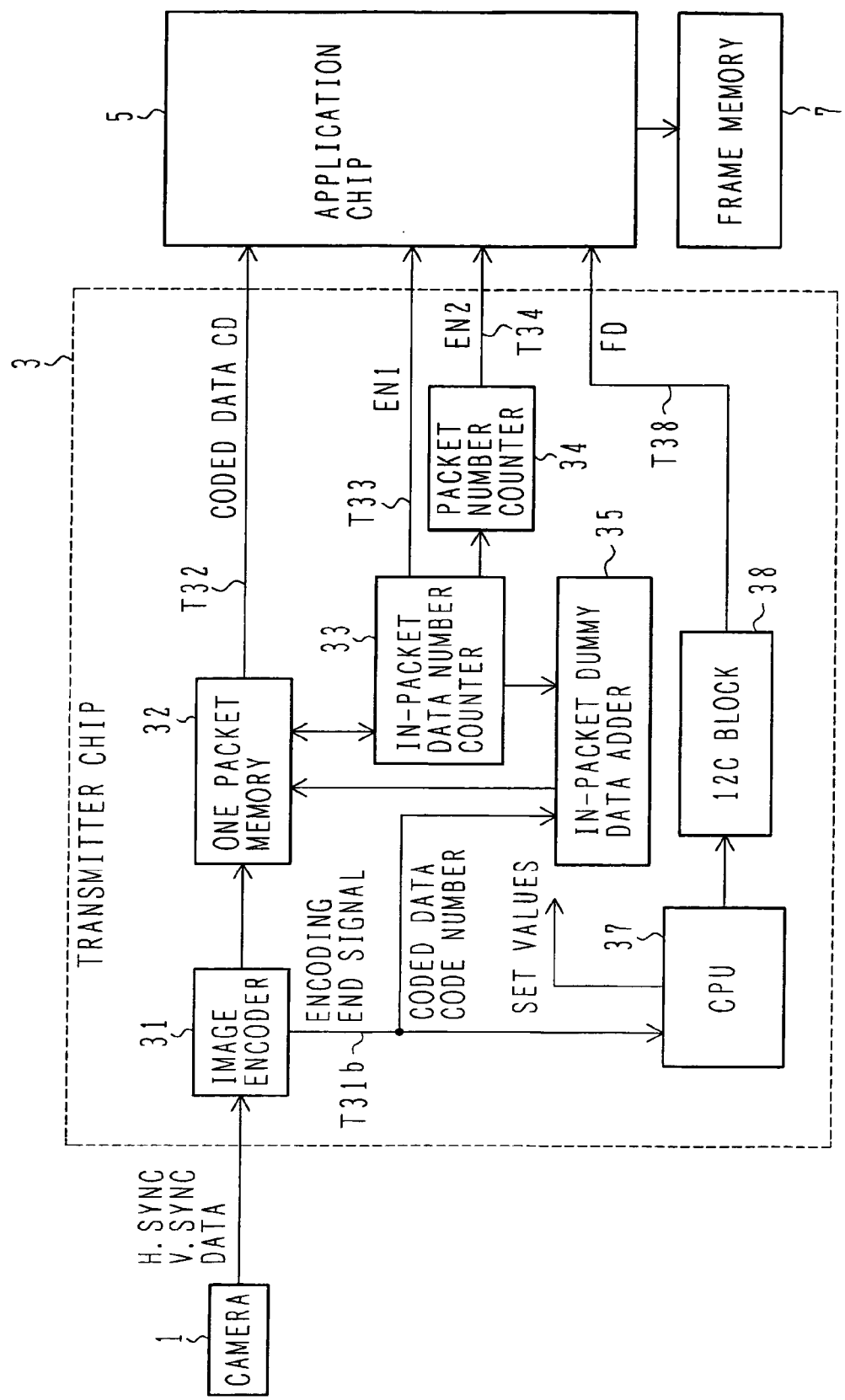
FIG. 1 is a block diagram showing the structure of an image transmitter according to an embodiment of the invention.
Figure 3A:
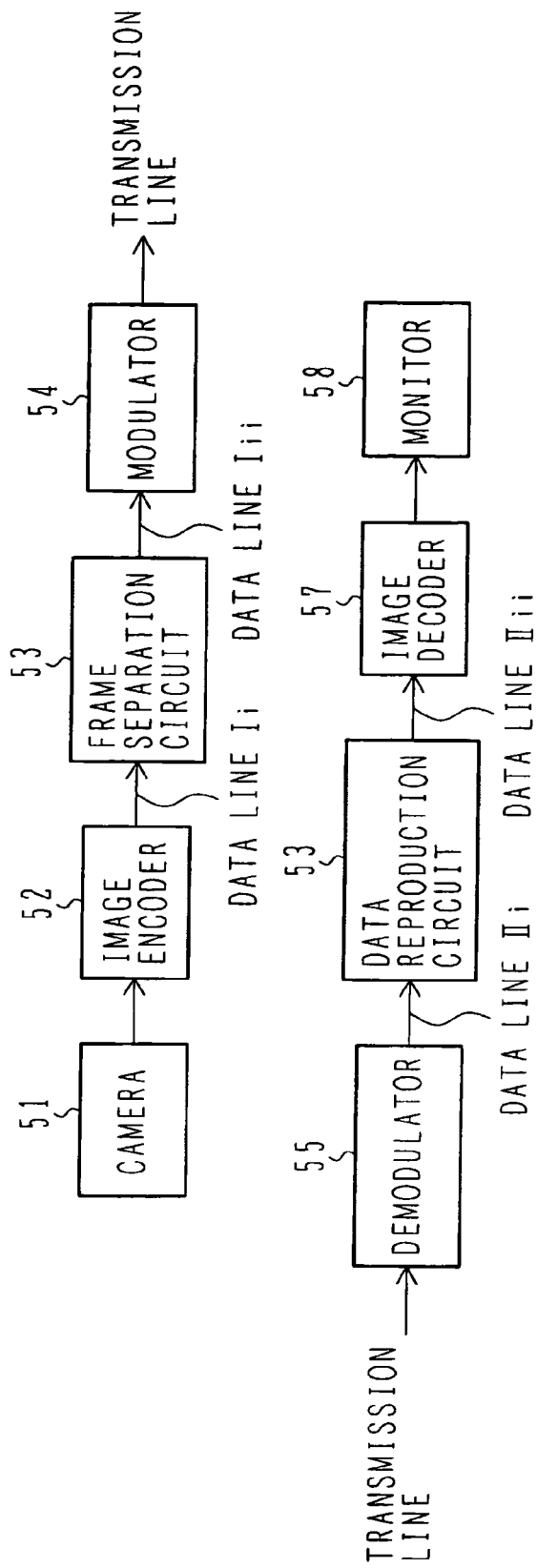
FIGS. 3A and 3B are a block diagram showing the structure of an image transmitter according to prior art and a diagram showing frame data format of image data.
Figure 3B:
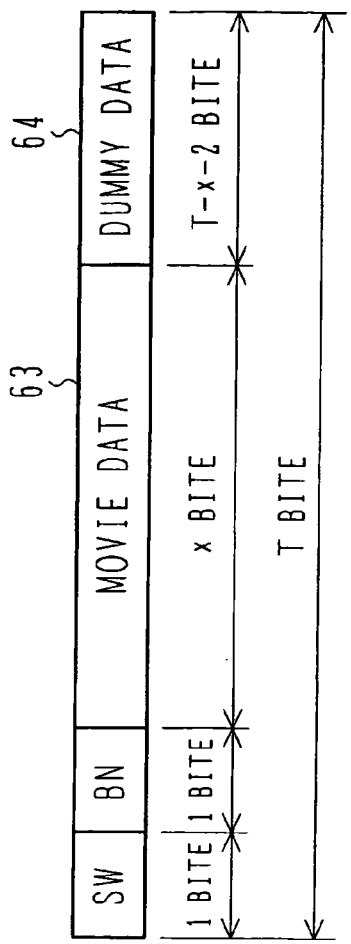

FIG. 1 is a block diagram showing the configuration of an image transmission system according to an embodiment of the present invention. A camera 1 supplies image data or the like to an image transmitter 3, and the image transmitter 3 supplies coded image data to an application chip 5. The application chip 5 writes the received image data in a frame memory 7 to use it for desired applications. In the following, description will be made on each constituent component, and the image transmitter 3 among others will be described in detail.

The camera 1 acquires moving image data at a predetermined time interval, and supplies the image data together with a horizontal sync signal H.SYNC and a vertical sync signal V.SYNC to an image encoder 31 of the image transmitter 3.

The image encoder 31 encodes input image data by JPEG-compression and stores it in a one packet memory 32 having one packet capacity. As compared to the capacity of one frame, the capacity of one packet is very small. The one packet memory 32 buffers the supplied coded image data. An in-packet data number counter 33 is connected to the one packet memory 32. The in-packet data number counter 33 counts the number of coded data buffered in the one packet memory 32. The data number is supplied from the in-packet data number counter 33 to an in-packet dummy data adder 35.

When the number of data buffered in the one packet memory 32 reaches an in-packet fixed data number, the one packet memory 32 outputs packetized coded data CD to an output line T32. The in-packet data number counter 33 supplies a first enable signal EN1 to the output line T33 and a packet number counter 34. The first enable signal EN1 rises at the start of transmission of one packet coded data and falls at the end of the transmission.

The packet number counter 34 receives and counts the first enable signal EN1 and supplies a second enable signal EN2 to an output line T34. The second enable signal EN2 rises at the start of transmission of a first packet and falls at the end of transmission of the packet corresponding to the last of the assumed fixed number of packets (for simplicity, 8 packets are assumed) in a frame on the assumption of which number the application chip is fabricated. Since the second enable signal is generated depending upon the packet number, the second enable signal becomes an enable signal independent from the start and end of a frame.

Image data supplied from the camera 1 is in the unit of frame. When image data of one frame is encoded, the image encoder 31 generates an encoding end signal and a code number of coded data and supplies them to an in-packet dummy data adder 35 and a CPU 37. When the coding of one frame has finished, if the number of coded data buffered in the one packet memory 32 does not reach the in-packet fixed data number, the coded data stored in the one packet memory 32 is not allowed to be transmitted. The in-packet dummy data adder 35 is provided for transmitting the last packet of a frame. The in-packet dummy data adder 35 receives the data number from the in-packet data number counter 33 and supplies the one packet memory 32 with dummy data of the number of data being short for constituting the last packet, to make the packet in one packet memory 32 a complete packet, which is then transmitted as the last packet in the frame.

CPU 37 outputs frame data FD to an output line T38 via an I2C block 38. The frame data FD contains the encoding end signal of image data of one frame and the number of coded data in the frame. In this case, if the packet number does not reach the fixed packet number, the packet number counter 34 maintains the second enable signal high. CPU 37 can also change set values such as the fixed data number and fixed packet number.

As image data of the next frame is supplied from the camera 1, the image encoder 31 starts new encoding. The one packet memory 32, in-packet data number counter 33 and packet number counter 34 continue operations similar to those described above. The second enable signal falls after the number of first enable signals EN1 counted by the packet number counter 34 reaches the fixed packet number.

The application chip 5 receives each packet having the fixed data number while the first enable signal is high, and receives the packets of the fixed packet number while the second enable signal is high. The received coded image data is written in the frame memory 7.

The operation in the unit of frame is performed by each of the camera 1, image encoder 31, in-packet data number counter 35, CPU 37 and I2C block 38. The packet number counter 34 performs an enable signal generating operation in the unit of predetermined packet number, independently from the frame. Therefore, a frame end timing is generally different from the timing of the second enable signal EN2 indicating transmission of a predetermined set of packets. The application chip 5 receives a packet of coded data CD of the fixed data number, and receives a set of packets of the fixed packet number indicated by the second enable signal EN2. Therefore, the application chip can receive the coded data and write it in the frame memory 7. In addition, since the application chip 5 receives information on each frame as the frame data FD, it can separate coded image data written in the frame memory 7 and reconfigure it as a frame.

FIG. 2A is a timing chart illustrating the operation of the image transmitter 3 shown in FIG. 1. The coded data CD shown at the uppermost row illustrates the state in which input image signals are encoded and output as packets of the fixed data number. The first frame F1 has five packets, the next frame F2 has seven packets, and the second next frame F3 has four packets. The last packet in each frame is represented by FE.

The first enable signal EN1 shown at the second row is an enable signal which becomes high at the start of transmission of each packet and low at the end of the transmission. In the example shown in FIG. 2A, the second enable signal EN2 shown at the third row is an enable signal which becomes high at the start of transmission of eight packets, which is the fixed packet number, and becomes low at the end of the transmission. By using these enable signals EN1 and EN2, the application chip 5 receives the coded data CD by judging as if fixed length frame data in the unit of 8 packets is input. In the above description, although the enable signals become enable at a high level and disable at a low level, they may be inverted to become disable at the high level and enable at the low level.

The frame data FD shown at the lowermost row is generated after the end of transmission of the last packet of each frame and transmits information such as the coded data number. This information is used for processing received coded image data after the second enable signal EN2 falls.

In the embodiment described above, when image data of one frame is encoded and if the number of data buffered in the one packet memory is smaller than the in-packed fixed data number, the dummy data adder 35 adds dummy data to complete a packet. Since the coded image data of one frame starts always from the start of a packet, subsequent processes can be performed easily.

FIG. 2B is a schematic diagram showing the contents of the last packet FE in which the stored coded data is short of the predetermined data number, and dummy data is added to complete the packet. The predetermined data number Lpk includes real coded data RCD and dummy coded data DCD.

If data of two frames mixed in one packet can be processed, a packet coupling the end of a preceding frame and the start of a succeeding frame may be formed without adding dummy data. In this case, the dummy data adder 35 may be omitted. The preceding frame is exchanged to the succeeding frame at the midst of one packet.

FIG. 2C shows an example of a packet constituted of the last packet of an i-th frame, whose real coded data RCD (Fi) is smaller than the fixed data number, and real coded data RCD (Fi+1) of the next frame. In this case, the packet of coded data belongs to two frames. The frame data FD generated after the end of one frame, is generated independently from the packet period. However, there is no practical problem because the frame data is transmitted via the dedicated output line T38.

In the above description, the I2C block 38 outputs the frame data after image data of one frame is encoded. This transmission function may be omitted. In this case, headers indicating the start and end of a frame are added to coded data itself.

The present invention has been described in connection with the preferred embodiments. The invention is not limited only to the above embodiments. It will be apparent to those skilled in the art that other various modifications, improvements, combinations, and the like can be made.

I claim:

1. An image transmitter comprising:
   an encoder for receiving image data and outputting coded image data;
   a packet transmitter for receiving the coded image data from said encoder, buffering the coded image data while counting a data number, and when coded image data of one packet corresponding to a fixed data number is buffered, packetizing the coded image data and transmitting the packetized coded image data;
   a first enable signal generator for generating a first enable signal which becomes enable at a start of transmission of each packet and disable at an end of transmission; and
   a second enable signal generator for generating a second enable signal which becomes enable at a start of transmission of packets of a fixed packet number and disable at an end of transmission.

2. The image transmitter according to claim 1, wherein said second enable signal generator receives and counts said first enable signal to generate said second enable signal.

3. The image transmitter according to claim 2, further comprising a dummy data adder for adding dummy data, in a state that said encoder outputs coded image data of one frame to said packet transmitter and the number of data in a last packet is smaller than the fixed data number, to the data in the last packet.

4. The image transmitter according to claim 2, wherein said encoder outputs information including an encoding end and a coded data number of a frame after said encoder encodes image data of a frame.

5. The image transmitter according to claim 4, further comprising a communication function unit for receiving said information from said encoder and transmitting frame data including the coded data number of the frame.

6. The image transmitter according to claim 1, further comprising a dummy data adder for adding dummy data, in a state that said encoder outputs coded image data of one frame to said packet transmitter and the number of data in a last packet is smaller than the fixed data number, to the data in the last packet.

7. The image transmitter according to claim 6, wherein said encoder outputs information including an encoding end and a coded data number of a frame after said encoder encodes image data of a frame.

8. The image transmitter according to claim 7, further comprising a communication function unit for receiving said information from said encoder and transmitting frame data including the coded data number of the frame.

9. The image transmitter according to claim 1, wherein said encoder outputs information including an encoding end and a coded data number of a frame after said encoder encodes image data of a frame.

10. The image transmitter according to claim 9, further comprising a communication function unit for receiving said information from said encoder and transmitting frame data including the coded data number of the frame.

11. An image transmitting method comprising:
    an encoding step of receiving image data at an encoder and outputting coded image data from the encoder;
    a packet transmitting step of receiving at a memory the coded image data output from the encoder, buffering the coded image data in the memory while counting a data number received by the memory, and when coded image data of one packet corresponding to a fixed data number is buffered in the memory, packetizing the coded image data and transmitting the packetized coded image data from a transmitter;

a first enable signal generating step of generating a first enable signal which becomes enable at a start of transmission of each packet from the transmitter and disable at an end of transmission of said each packet from the transmitter; and a second enable signal generating step of generating a second enable signal which becomes enable at a start of transmission of a fixed number of packets from the transmitter and disable at an end of transmission of the fixed number of packets from the transmitter.

12. The image transmitting method according to claim 11, wherein said second enable signal generating step receives and counts a number of first enable signals to generate said second enable signal.

13. The image transmitting method according to claim 12, further comprises a dummy data adding step of adding dummy data, in a state that said encoder outputs coded image data of one frame and the number of data in a last packet is smaller than the fixed data number, to the data in the last packet.

14. The image transmitting method according to claim 13, wherein said encoding step outputs information including an encoding end and a coded data number of a frame after said encoding step encodes image data of a frame.

15. The image transmitting method according to claim 14, further comprising a communication step of receiving said information and transmitting frame data including the coded data number of the frame.

16. The image transmitting method according to claim 12, wherein said encoding step outputs information including an encoding end and a coded data number of a frame after said encoding encodes image data of a frame.

17. The image transmitting method according to claim 16, further comprising a communication step of receiving said information and transmitting frame data including the coded data number of the frame.

18. The image transmitting method according to claim 11, further comprising a dummy data adding step of adding dummy data, in a state that said encoding step outputs coded image data of one frame and the number of data in a last packet is smaller than the fixed data number, to the data in the last packet.

19. The image transmitting method according to claim 11, wherein said encoding step outputs information including an encoding end and a coded data number of a frame after said encoding step encodes image data of a frame.

20. The image transmitting method according to claim 19, further comprising a communication step of receiving said information and transmitting frame data including the coded data number of the frame.

\* \* \* \* \*